United States Patent Office 3,202,667
Patented Aug. 24, 1965

3,202,667
6 - METHOXY - 1 METHYL - 9H - PYRIDO[3-4-b] INDOLE - 3 - CARBOXYLIC ACID, ESTERS AND ITS ACID ADDITION SALTS
Jacob Szuszkovics and Gilbert A. Youngdale, both of Kalamazoo, Mich., assignors to The Upjohn Company, Kalamazoo, Mich., a corporation of Delaware
No Drawing. Filed Nov. 6, 1963, Ser. No. 321,804
5 Claims. (Cl. 260—295)

This invention relates to novel indole derivatives, intermediates and acid addition salts thereof.

The compounds of this invention include (1) 6-methoxy-1-methyl-9H pyrido [3,4-]indole - 3 - carboxylic acids and esters thereof having the formula

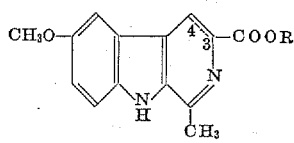

wherein R is hydrogen or lower alkyl of 1–4 carbon atoms (e.g., methyl, ethyl, propyl, butyl and isomeric forms thereof), and the 3–4 linkage is a single or double bond, and (2) the physiologically acceptable acid addition salts of the foregoing compounds, such aa the hydrochloride, hydrobromide, acetate, pyruvate, sulfate, phosphate, citrate, tartrate, salicylate, lactate, succinate, benzoate, nitrate, p-toluenesulfonate and the like. Also included is the intermediate, 3,4-dihydro-3,3-dicarbetoxy-6-methoxy-1-methyl-9H-pyrido[3,4-b]indole, having the formula

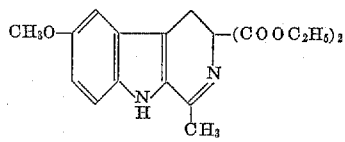

The products and intermediates of this invention are named in accord with the basic structure having positions numbered as follows

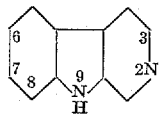

The compounds of Formula I demonstrate anti-inflammatory, anorexigenic and sedative properties and can be administered to humans and animals as the primary active ingredients of conventional pharmaceutical forms such as tablets, capsules, elixirs, injectable solutions and suspensions and the like. Additionally, the free bases form salts with fluosilicic acid which are useful as mothproofing agents in accord with U.S. Patents 1,915,334 and 2,075,359. The free bases also form salts with thiocyanic acid which condense with formaldehyde to from resinous materials useful as pickling inhibitors according to U.S. Patents 2,425,320 and 2,606,155.

In preparing the products of this invention the known ethyl 2-acetamido-2-carbethoxy-3-(5-methoxyindol-3-yl) propionate is cyclized in the presence of phosphorus oxychloride or phosphorus pentoxide to yield 3,4-dihydro-3,3-dicarbethoxy-6-methoxy-1-methyl - 9H - pyrido[3,4-b] indole. Hydrolysis and decarboxylation of this dicarbethoxy product gives 3,4 - dihydro - 6 - methoxy-1 - methyl - 9H - pyrido[3,4 - b]indole - 3 - carboxylic acid, conviently isolated as the hydrochloride monohydrate, which can readily be converted to the free base by neutralization of the acid salt. Esterification and dehydrogenation are accomplished by reaction of the said carboxylic acid hydrochloride monohydrate with methanolic 2,2-dimethoxypropane followed by heating in the presence of palladium-on-charcoal catalyst to produce methyl 6-methoxy-1-methyl-9H-pyro [3,4-b]indole-3-carboxylate, which on hydrolysis gives 6 - methoxy - 1 - methyl-9H-pyrido[3,4-b]indole-3-carboxylic acid. Treatment of each of the free bases of Formula I with the appropriate acid, such as hydrochloric, hydrobromic, acetic and the like, produces the corresponding acid addition salt as alluded to above.

The following examples illustrate the synthesis of representative products of this invention but are not to be construed as limiting the scope thereof.

EXAMPLE 1

3,4-dihydro-3,3-dicarbethoxy-6-methoxy-1-methol-9H-pyrido[3,4-b]indole

Thirty grams of ethyl 2-acetamido-2-carbethoxy-3-(5-methoxyindol-3-yl)propionate was mixed with 120 ml. of freshly distilled phosphorus oxychloride. The solution was heated under gentle reflux for 90 minutes. Excess phosphorus oxychloride was removed under reduced pressure while heated in an oil bath at about 70° C. The residue was triturated well with dry ether, filtered, and washed with dry ether. The solid was crystallized from methanol-ether giving 11.3 g. of crude hydrochloride. The hydrochloride was triturated with dilute ammonium hydroxide and the mixture was extracted with two 400-ml. portions of benzene. The combined benzene solutions were washed once with 100 ml. of dilute ammonium hydroxide and once with water and then dried over anhydrous magnesium sulfate. The benzene was removed under reduced pressure yielding a yellow solid. The solid was crystallized from acetone-Skellysolve B (hexane hydrocarbons), yielding 7.6 g. of 3,4-dihydro-3,3-dicarbethoxy - 6 - methoxy-1-methyl-9H-pyrido[3,4-b]indole as yellow needles, M.P. 177–179° C. Two recrystallizations from acetone-Skellysolve B raised the melting point to 179.8–181.3° C.

Analysis.—Calcd. for $C_{19}H_{22}N_2O_5$: C, 63.67; H. 6.19; N, 7.82. Found: C. 64.09; H, 6.25; N, 7.27.

EXAMPLE 2

3,4-dihydro-6-methoxy-1-methyl-9H-pyrido[3,4-b]-indole-3-carboxylic acid hydrochloride monohydrate 3,4-dihyro-3,3 - dicarbethoxy-6-methoxy - 1-methyl-9H-pyrido[3,4-b]indole (9.15 g.) was wetted with a little ethanol and 63 ml. of N sodium hydroxide solution was added. The mixture was warmed on the steam bath for 3½ hours and then filtered. To the filtrate was slowly added 105 ml. of 4 N hydrochloric acid, which caused a yellow solid to separate. The mixture was heated on the steam bath for 30 minutes. After cooling the solid was collected and air-dried, M.P. 198–200° C. (decomp.). Crystallization from methanol-ether gave 6.2 g. of 3,4-dihydro-6-methoxy-1 - methyl-9H-pyrido [3,4-b]indole-3 carboxylic acid hydrochoride monohydrate as small yellow needles, M.P. 198–200° C. (decomp.).

Analysis.—Calcd. for $C_{14}H_{14}N_2O_3 \cdot HCl \cdot H_2O$: C, 53.75; H, 5.48; Cl, 11.34; N, 8.96. Found: C. 53.82; H, 5.44; Cl, 11.85; N, 8.95.

EXAMPLE 3

3,4-dihydro-6-methoxy-1-methyl-9H-pyrido [3,4-b]indole-3-carboxylic acid

Neutralization of the acid hydrochloride monohydrate of Example 2 with sodium hydroxide solution, followed by conventional purification and drying under vacuum, gives the free base, 3,4-dihydro-6-methoxy-1-methyl-9H-pyrido [3,4-b]indole-3-carboxylic acid.

EXAMPLE 4

*Methyl-6-methoxy-1-methyl-9H-pyrido [3,4-b]indole-3-carboxylate*

A mixture of 10.5 g. of 3,4-dihydro-6-methoxy-1-methyl-9H-pyrido[3,4-b]indole-3-carboxylic acid hydrochloride monohydrate, 200 ml. of methanol, 100 ml. of 2,2-dimethoxypropane, and 50 ml. of methanol saturated with anhydrous hydrogen chloride was allowed to stand 4 days at room temperature with occasional stirring. The liquids were removed under reduced pressure without heating. The residue was treated with 200 ml. of 10% sodium carbonate solution. The mixture was extracted with two 200-ml. portions of ether. The ether solution was washed with three 100-ml. portions of water and dried over anhydrous magnesium sulfate. The ether was removed first on the steam bath and then under reduced pressure, yielding a brown viscous oil. A mixture of the oil, 175 ml. of redistilled decahydronaphthalene, and 4 gm. of 10% palladium-on-charcoal catalyst was heated under reflux for 2½ hours. After cooling, the solid which separated (some during the refluxing) and the catalyst were removed by filtration. The filter paper containing the solid and catalyst was then washed with 1600 ml. of warm methanol. The methanol was removed under reduced pressure on the steam bath, yielding a yellow solid. The solid could not be dissolved completely in 400 ml. of boiling methanol. The volume was reduced to 250 ml. Cooling yielded 0.9 gm. of yellow solid, M.P. 257–290° C. (sintering 233° C.). The filtrate was reduced to 25 ml. and cooled to give 3 gm. of yellow crystals, M.P. 232–237° C. (sintering 288° C.). Three recrystallizations from acetone-Skellysolve B gave 1 gm. of yellow prisms, M.P. 237–242° C. (decomp.) (sintering 226° C.). The filtrates were evaporated and the residue was chromatographed on a magnesium silicate column. The column was eluted with an increasing proportion of acetone in Skellysolve B mixture. The only solid obtained was eluted by 50% acetone-Skellysolve B. Two recrystallizations from acetone-Skellysolve B gave 0.85 gm. of methyl 6-methoxy-1-methyl - 9H-pyrido[3,4-b]indole-3-carboxylate as pale yellow prisms, M.P. 242–245° C. (decomp.) (sintering 236° C.).

*Analysis.*—Calcd. for $C_{15}H_{14}N_2O_3$: C, 66.63; H, 5.22; N, 10.37. Found: C, 66.86; H, 5.20; N, 10.65.

EXAMPLE 5

*6-methoxy-1-methyl-9H-pyrido[3,4-b] indole-3-carboxylic acid sesquihydrate*

A mixture of 2 gm. (0.0074 mole) of methyl 6-methoxy-1-methyl-9H - pyrido[3,4-b]indole-3-carboxylate and 50 ml. of N sodium hydroxide solution was heated under reflux for 4 hours. After cooling, the solution was acidified with 5 ml. of acetic acid, causing a yellow solid to precipitate. The solid was collected by filtration and washed with water. The solid was crystallized from aqueous acetic and dried under vacuum, giving 1.8 gm. (89%) of 6-methoxy-1-methyl-9H-pyrido[3,4-b]indole-3-carboxylic acid sesquihydrate as small yellow needles, M.P. 290–294° C. (decomp.) (sintering 270° C.).

*Analysis.*—Calcd. for $C_{14}H_{12}N_2O_3 \cdot 1.5H_2O$: C, 59.34; H, 5.34; N, 989. Found: C, 59.70; H, 4.89; N, 10.12.

EXAMPLE 6

*Acid addition salts*

Treatment of the free base products of Examples 3, 4 and 5 by conventional means with an acid such as hydrochloric, hydrobromic, acetic, pyruvic, sulfuric, phosphoric, citric, tartaric, salicylic, lactic, succinic, benzoic, nitric, p-toluenesulfonic and the like, followed by purification in the usual manner, giving the corresponding acid addition salt.

What is claimed is:

1. A compound selected from the group consisting of (1) substituted 6-methoxy-1-methyl-9H-pyrido[3,4-b]indoles of the formula

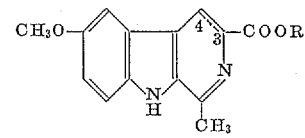

wherein R is a member selected from the group consisting of hydrogen and lower alkyl of 1–4 carbon atoms, and the 3–4 linkage is selected from linkages consisting of single and double bonds, and (2) physiologically acceptable acid addition salts thereof.

2. 3,4-dihydro-3,3-dicarbethoxy - 6-methoxy-1-methyl-9H-pyrido[3,4-b]indole.

3. 3,4-dihydro-6-methoxy - 1-methyl-9H-pyrido[3,4-b]indole-3-carboxylic acid.

4. Methyl 6-methoxy-1-methyl - 9H-pyrido[3,4-b]indole-3-carboxylate.

5. 6-methoxy-1-methyl - 9H-pyrido[3,4-b]indole-3-carboxylic acid.

References Cited by the Examiner

FOREIGN PATENTS 612,725   1/62   Belgium.
612,726   1/62   Belgium.
612,727   1/62   Belgium.

OTHER REFERENCES

Snyder et al.: J. of Amer. Chem. Society, 70 pp. 219–22 (1948).

WALTER A. MODANCE, *Primary Examiner.*

UNITED STATES PATENT OFFICE
CERTIFICATE OF CORRECTION

Patent No. 3,202,667            August 24, 1965

Jacob Szuszkovicz et al.

It is hereby certified that error appears in the above numbered patent requiring correction and that the said Letters Patent should read as corrected below.

Column 1, line 14, for "[3,4-[indole-" read -- [3,4-b] indole- --; lines 16 to 21, the formula should be designated as formula -- I --; line 26, for "aa" read -- as --; same column 1, line 68, for "conviently" read -- conveniently --; column 2, line 4, for "-9H-pyro" read -- -9H-pyrido --; line 17, for "methol-", in italics, read -- methyl- --; in italics; column 4, line 3, after "acetic" insert -- acid --; line 8, for "N, 989" read -- N, 9.89 --.

Signed and sealed this 19th day of April 1966.

(SEAL)
Attest:

ERNEST W. SWIDER
Attesting Officer

EDWARD J. BRENNER
Commissioner of Patents